UNITED STATES PATENT OFFICE.

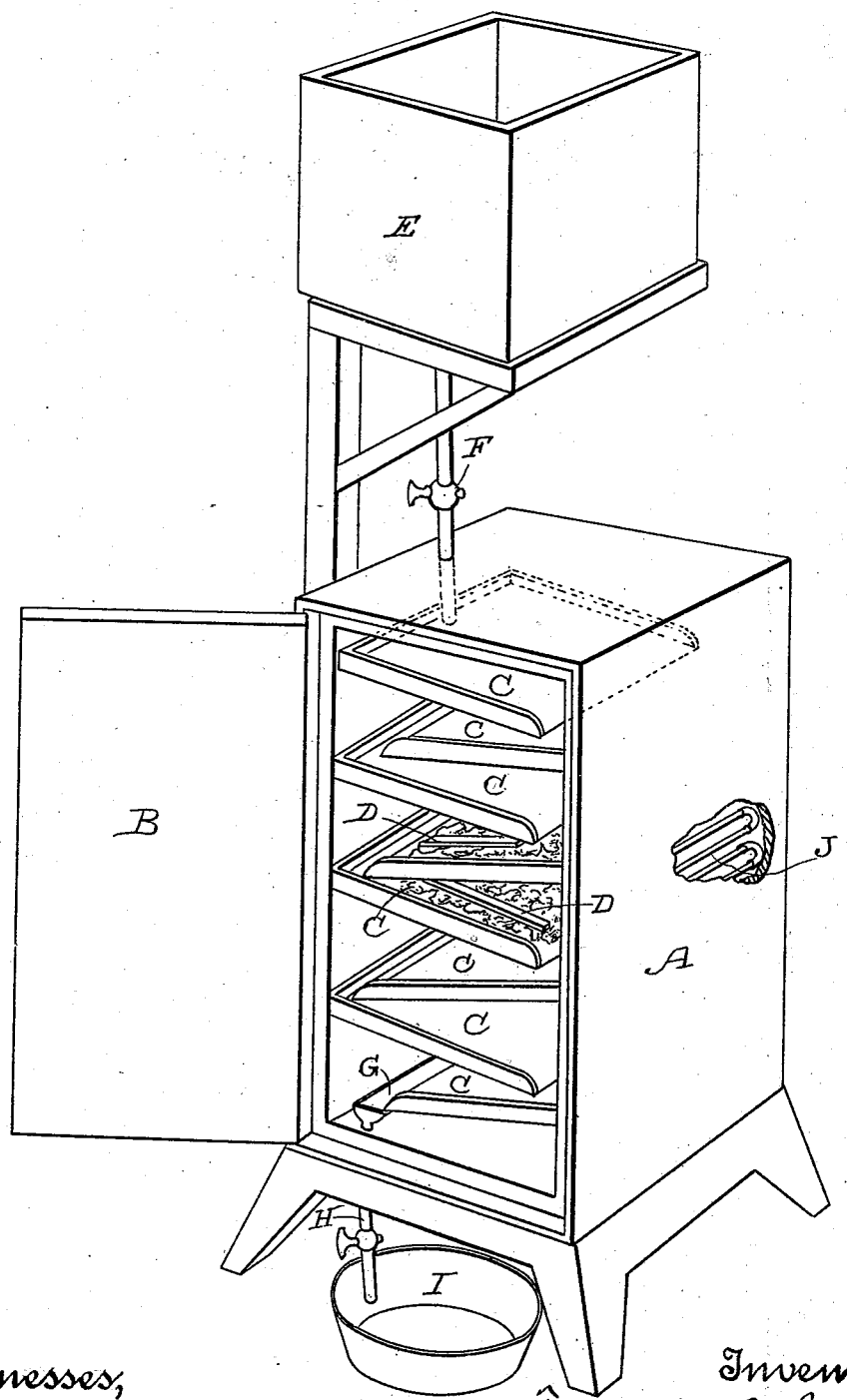

FREDERICK A. BECKETT AND WILLIAM C. SPENCER, OF SAN FRANCISCO, CALIFORNIA.

PROCESS OF AND APPARATUS FOR EXTRACTING PERFUMES.

SPECIFICATION forming part of Letters Patent No. 548,797, dated October 29, 1895.

Application filed March 30, 1893. Serial No. 468,333. (No model.)

*To all whom it may concern:*

Be it known that we, FREDERICK A. BECKETT and WILLIAM C. SPENCER, citizens of the United States, residing in the city and county of San Francisco, State of California, have invented an Improvement in Processes of and Apparatus for Extracting Perfumes; and we hereby declare the following to be a full, clear, and exact description of the same.

Our invention relates to a process of and apparatus for extracting the perfume contained in flowers and other substances.

It consists in the application of a dilute acid to the flowers or substances from which the perfume is to be extracted and in certain details of construction of apparatus, which will be more fully explained by reference to the accompanying drawing, in which the figure illustrates an apparatus by which the process may be carried out.

The object of our invention is to extract the perfume from flowers, and it is dependent upon the power of certain dilute acids to extract the odoriferous matter from the flower or other substance which is being treated when brought in contact with the perfume-containing substance. We have experimented with several acids with good results, but have here described the use of sulfuric acid, which is very suitable. A few rose-leaves, for instance, in sulfuric acid and water are capable of yielding a very great quantity of perfume. We prefer to make use of fresh flowers collected at such time of the season as when they are found to be richest in odor. Dried flowers also produce very satisfactory results. When the petals are treated by this process, we find that some time is required for the sulfuric acid to act on the odoriferous pockets or cells before the desired odor characterizing the particular perfume of the flower under treatment is brought forth. The proportion of acid to water may be varied to suit conditions; but we have found that about one part of acid to four of water is very efficacious. The diluted solution gradually absorbs the perfume contained in the flower and acquires a slight color, which, however, is not necessarily that of the flower under treatment.

Care must be taken to separate the flowers from the solution after the desired odor is extracted; otherwise the agreeable and characteristic odor would be entirely overcome by another disagreeable one, possibly due to the decomposition or carbonizing of the vegetable matter of the flower.

It is impossible to lay down any rules for the time required for the treatment, as this depends upon the season of the year and climatic conditions, as well as the conditions under which the flower has been gathered, the variety of the flower, and on the relative strength of the acid used.

In the accompanying drawing we have shown an apparatus which may be employed for carrying out the process in a rapid and effective manner and obviating the possibility of overtreatment. It consists of a box or case A, made of any suitable form or material and hermetically closed. This case has, preferably, a door B upon one side, which may be opened to expose the interior or closed when the operation is going on. Within the case are a series of shelves C, alternately inclined in opposite directions and having connecting-passages between the lower ends of each shelf and the upper ends of the next adjacent shelf below. These shelves are made of any material which will not be attacked by the acid, preferably glass or porcelain, and in conjunction with them we use plates of glass or porcelain, which may be laid on the top of the odoriferous substance which is placed upon the shelves. The odoriferous leaves are preferably placed upon these shelves in a single layer, and the supplemental plates D are placed above them to prevent their being swept away by the passage of the dilute acid. This dilute acid is contained in a tank E, situated sufficiently high above the apparatus so that when the stop-cock F is opened the acid will flow through the pipe, and by any suitable form of distributer it is directed over the entire surface of the upper shelf, flowing through the substances which are there contained. At the lower edge it passes off upon the higher edge of the shelf next below, and it thus passes alternately from one side to the other until it has reached the lower shelf, from the lower edge of which it is delivered into a receiver G, from which it flows by pipe H into a receiving-vessel I. From this vessel it may be again returned to the supply-tank, and thus passed over the substances as many times as may be desired to produce the proper degree of saturation without carrying the process so far as to produce the undesirable action previously described.

Inside the casing and attached in any suitable position is a coil of pipes J, through which hot water or steam may be passed in order to raise the temperature to any desired point. We have found that a temperature from summer-heat to blood-heat is very favorable for the development of the odors.

When the acid solution has been passed over the flowers a sufficient number of times and as soon as it is found to be sufficiently impregnated with the particular odor of the substances under treatment, the acid is immediately neutralized with any suitable clean and odorless alkali, such as soda. The neutral but odoriferous product thus resulting is well filtered in any suitable and well-known manner and is then ready to be delivered to the laboratory of the perfumer.

By raising the supplemental plates the material treated can be removed and, if necessary, others substituted for them until the acid solution has reached the proper degree of saturation.

Having thus described our invention, what we claim as new, and desire to secure by Letters Patent, is—

1. A process of extracting perfumes from flowers consisting in passing dilute sulfuric acid over the leaves containing the odoriferous element and afterward neutralizing the acid in the product, substantially as herein described.

2. An apparatus for treating odoriferous substances containing perfumes consisting of a series of inclined acid proof shelves such as glass or porcelain alternately inclined in opposite directions, and having connecting passages between the lower ends of each shelf, and the upper ends of the next adjacent shelf below, an inclosing case surrounding the shelves, a tank from which dilute sulfuric acid is supplied to the upper edge of the upper shelf so as to flow through the leaves thereon and be delivered to the upper edge of the next adjacent shelf, means for maintaining the leaves upon the shelves so that they will not be displaced by the passage of the acid, and a heating coil inside of the case for regulating the temperature thereof.

In witness whereof we have hereunto set our hands.

FREDERICK A. BECKETT.
WILLIAM C. SPENCER.

Witnesses:
GEO. H. STRONG,
S. H. NOURSE.